United States Patent
Mourra

(10) Patent No.: US 9,281,712 B2
(45) Date of Patent: Mar. 8, 2016

(54) ELECTRICAL POWER CONDITIONING UNIT AND SYSTEM

(75) Inventor: Olivier Mourra, The Hague (NL)

(73) Assignee: AGENCE SPATIALE EUROPEENNE, Paris (FR)

( * ) Notice: Subject to any disclaimer, the term of this patent is extended or adjusted under 35 U.S.C. 154(b) by 912 days.

(21) Appl. No.: 13/520,746

(22) PCT Filed: Dec. 23, 2010

(86) PCT No.: PCT/IB2010/003534
§ 371 (c)(1),
(2), (4) Date: Aug. 1, 2012

(87) PCT Pub. No.: WO2011/083366
PCT Pub. Date: Jul. 14, 2011

(65) Prior Publication Data
US 2012/0286579 A1    Nov. 15, 2012

(30) Foreign Application Priority Data
Jan. 8, 2010  (EP) ................................... 10290004

(51) Int. Cl.
*H02J 7/35*     (2006.01)
*H02M 3/158*    (2006.01)

(52) U.S. Cl.
CPC ................ *H02J 7/35* (2013.01); *H02M 3/158* (2013.01); *H02M 3/1588* (2013.01); *Y02B 70/1466* (2013.01); *Y10T 307/696* (2015.04)

(58) Field of Classification Search
CPC ....... H02J 7/35; H02M 3/158; H02M 3/1588; H02M 3/005; H02M 3/1582; H02M 3/156; H01J 1/12; G05F 1/67; Y10T 307/696; Y10T 307/707; Y02E 10/566; Y02E 10/50–10/58; Y02B 70/1466; Y10S 323/906
USPC ................................. 307/43, 80, 82; 323/282
See application file for complete search history.

(56) References Cited

U.S. PATENT DOCUMENTS 3,489,915  A  *  1/1970  Engelhardt ...................... 307/66
4,186,336  A  *  1/1980  Weinberg et al. .............. 323/223

(Continued)

FOREIGN PATENT DOCUMENTS

EP         1 710 898        10/2006
EP         1 710 989        10/2006

(Continued)

*Primary Examiner* — Jared Fureman
*Assistant Examiner* — James P Evans
(74) *Attorney, Agent, or Firm* — Clark & Brody

(57) ABSTRACT

An electrical power conditioning for an electrical power conditioning system comprises a first terminal for connecting either an electrical power generator or a battery; a second terminal for connecting either a battery or an electrical power generator, respectively; a third terminal for connecting a power bus; characterized in that it further comprises: a reactive structure connected between said second terminal and the ground, formed by a serial connection of a first inductor, a capacitor and a second inductor, first and second nodes being provided between the first inductor and the capacitor, and between the capacitor and the second inductor, respectively; at least one output switching structure for connecting the third terminal to the first and second nodes through respective first and second switches and a third in-series inductor; and at least one input switching structure for connecting the first terminal to at least the first node through a third switch.

18 Claims, 15 Drawing Sheets

(56) References Cited

U.S. PATENT DOCUMENTS

| | | | |
|---|---|---|---|
| 4,764,922 A * | 8/1988 | Dieter et al. | 370/497 |
| 5,134,355 A * | 7/1992 | Hastings | 323/211 |
| 5,661,369 A * | 8/1997 | Sanderson | 315/105 |
| 5,774,348 A * | 6/1998 | Druce et al. | 363/60 |
| 6,426,601 B1 * | 7/2002 | De Filippis et al. | 318/139 |
| 2002/0159282 A1 * | 10/2002 | Perol | 363/134 |
| 2006/0226817 A1 * | 10/2006 | Storm | 323/225 |
| 2009/0001955 A1 * | 1/2009 | Yoshida | 323/282 |
| 2012/0126627 A1 * | 5/2012 | Tonicello et al. | 307/82 |

FOREIGN PATENT DOCUMENTS

| | | |
|---|---|---|
| EP | 2 012 416 | 1/2009 |
| FR | 2 777 715 | 10/1999 |

\* cited by examiner

ELECTRICAL POWER CONDITIONING UNIT AND SYSTEM

The invention relates to an electrical power conditioning unit and system, in particular for a regulated solar bus. The invention applies in particular, although not exclusively, to spacecraft power systems.

In a satellite, or more generally a spacecraft, the main function of a Power Conditioning Unit (PCU) is to condition the energy coming from the relevant power sources (typically constituted by solar arrays and batteries) and to deliver it continuously to the users in an appropriate form during the overall mission.

Figure 1:
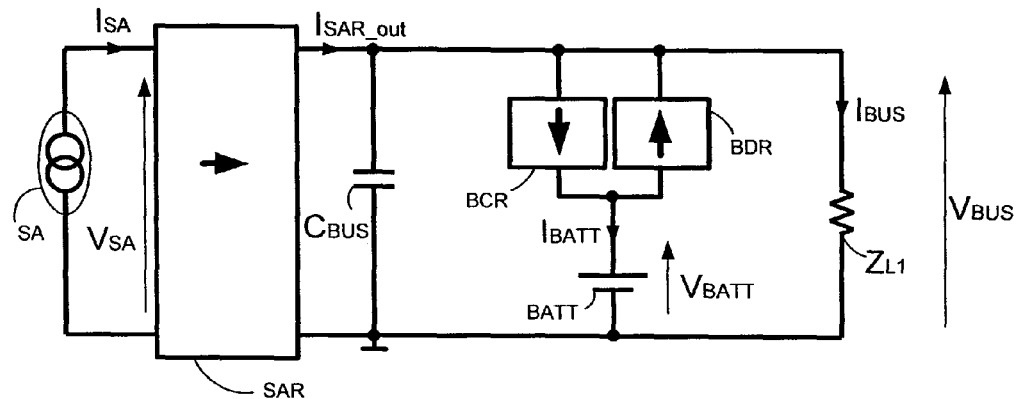

FIG. 1 illustrates a conventional centralized architecture for a solar regulated bus, of the kind implemented. on ESA spacecrafts e.g. Herschel Planck, Rosetta, Venus Express, Mars Express and Alphabus.

A solar array regulator (SAR) extracts the power from the solar array (SA, generating current $I_{SA}$ and voltage $V_{SA}$) and delivers it to the regulated power bus at a different voltage ($V_{bus}$) and current ($I_{SAR\_OUT}$) level. The bus is modeled by a capacity $C_{bus}$, and current $I_{bus}$ is absorbed by a load modeled by impedance $Z_{L1}$.

Two families of solar array regulators are widely used on spacecrafts:

a—Direct Energy transfer topologies as the Serial Switching Shunt Regulator ($S^3R$)—see document U.S. Pat. No. 4,186,336;

b—Pulse-Width-Modulation (PWM) converters with Maximum Power Point Tracker.

In addition to the solar array regulator, the task of replenishing the spacecraft batteries BATT in sunlight must be accomplished with a changing battery voltage characteristic during charge, absorbing current $I_{BATT}$ from the power bus and, at the same time, maintaining the bus voltage regulation. This function is performed by means of the Battery Charge Regulator (BCR).

Similarly, in eclipse operation the variation in voltage from the spacecraft batteries must be buffered from the power bus by the addition of a PWM (Pulse Width Modulation) Battery Discharge Regulator (BDR) in order to maintain the power bus at a constant voltage during the discharge of the batteries.

The advantages of the regulated bus are well known:
Simplification of the user voltage interface, leading to simpler secondary converter designs;
Greater standardization of equipments;
Simpler electromagnetic cleanliness control (ECC);
Flexibility and optimization of the battery and solar array design, which have more system mass impacts than the power conditioning equipment.

Centralized power regulated bus are rarely implemented for spacecrafts designed to operate in Low Earth Orbit (LEO). LEO orbits are characterized by a high eclipse-to-orbit ratio (about 33%): as a consequence, an e.g. 0.5 h heavy discharge must be replenished in a period of less than 1 h. The traditional power electronics regulated bus architecture (see FIG. 1) applied to LEO spacecraft would require heavy and large power converters, especially battery charge and discharge regulators. For this reason unregulated buses (directly connected to the battery, and therefore having a varying voltage level) are commonly implemented on LEO satellites, losing the advantages of the regulated bus. A further disadvantage of such a choice is that pulsed power loads cause conducted noise that has to be tolerated by all bus users, including the service equipment (platform), and this fact tends to complicate the design of the user equipment, including the requirement to use complex PWM-type converters.

For this reason the "converters in cascade" architecture is sometimes chosen to split the platform users and the pulsed power loads (FIG. 2): The platform users ($Z_{L1}$) are supplied by a regulated bus and the high power pulsed payload (not represented) is directly connected to the battery. Such architecture has been implemented on ESA Aeolus spacecraft in order to reduce the mass of the PCU versus the conventional regulated architecture. The power is extracted from the solar array to the battery with a S3R. Step-down converters connected to the battery bus were implemented to generate a regulated bus. For this specific example the regulated bus voltage is lower than the battery voltage, which lower than the solar array Maximum Power Point in all conditions: $V_{bus} < V_{BATT} < V_{MPP}$.

The cascaded architecture provides lower efficiency than the centralized one. Moreover, with a S3R connected to the battery, the power transferred to the bus depends both on the solar array characteristics and on the (variable) battery voltage. However, the cascaded architecture is easier to control than the centralized one, and avoids the use of too heavy converters in LEO applications.

Both architectures (centralized regulated bus—FIG. 1—and cascaded regulator—FIG. 2) can be used with several PWM converters in order to:
operate the solar arrays at their maximum power point, with the help of maximum power point trackers to extract the power from the solar arrays;
manage the charge and discharge of the battery; and
generate an external centralized regulated bus for other units.

Moreover, entirely different architectures have to be used for different mission.

The invention aims at providing an improved power conditioning unit architecture with reduced complexity, greater flexibility, increased efficiency and/or reduced mass.

According to the present invention, this result is achieved by the electrical power conditioning unit of claim 1, comprising:
a first terminal for connecting either an electrical power generator or a battery;
a second terminal for connecting either a battery or an electrical power generator, respectively;
a third terminal for connecting a power bus;
characterized in that it further comprises:
a reactive structure connected between said second terminal and the ground, formed by a serial connection of a first inductor, a capacitor and a second inductor, a first and second nodes being provided between the first inductor and the capacitor, and between the capacitor and the second inductor, respectively;
at least one output switching structure for connecting the third terminal to the first and second nodes through respective first and second switches and a third in-series inductor; and
at least one input switching structure for connecting the first terminal to at least the first node through a third switch.

Another object of the invention is an electrical power conditioning system comprising:
such an electrical power conditioning unit; and
a first control circuit for generating a first pulse-width modulation signal driving the first switch of said power conditioning unit, said first control circuit implementing a current control loop for generating said first pulse-width modulation signal using a first current feedback signal proportional to a current flowing through said third in-series inductor.

Figure 2:
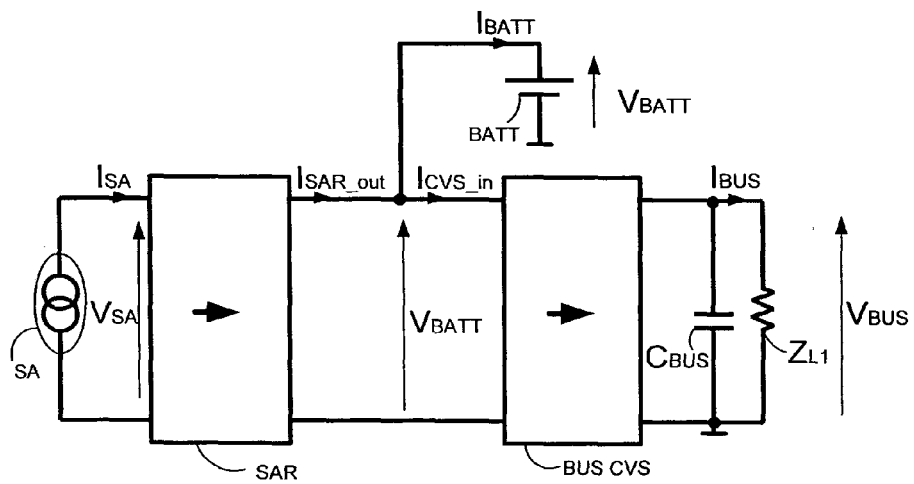
Figure 3:
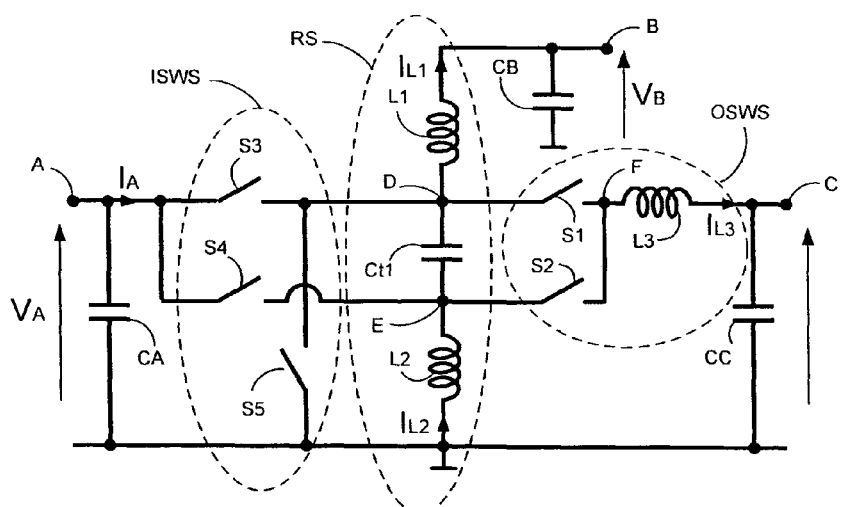
Figure 4:
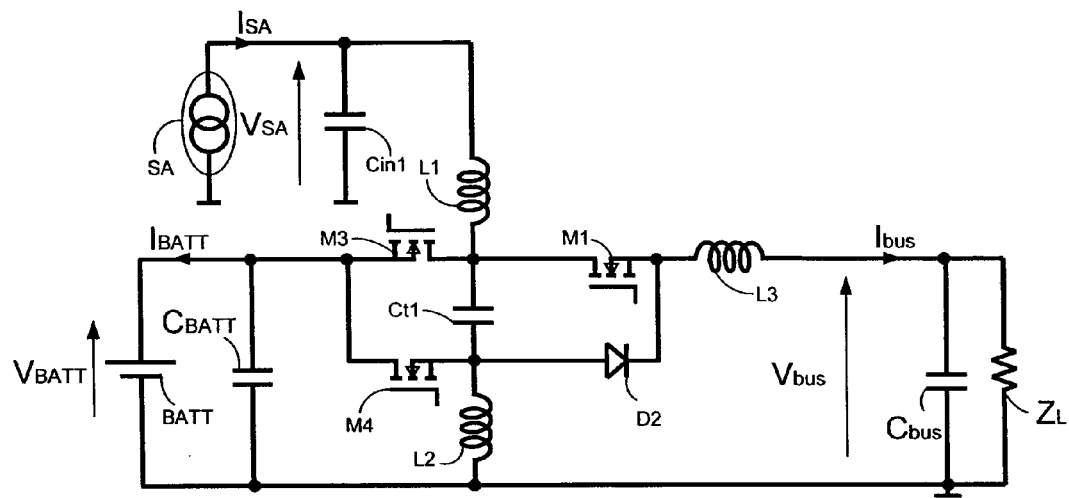
Figure 5:
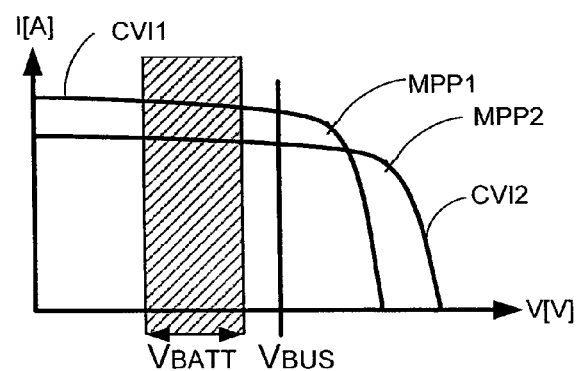
Figure 6:
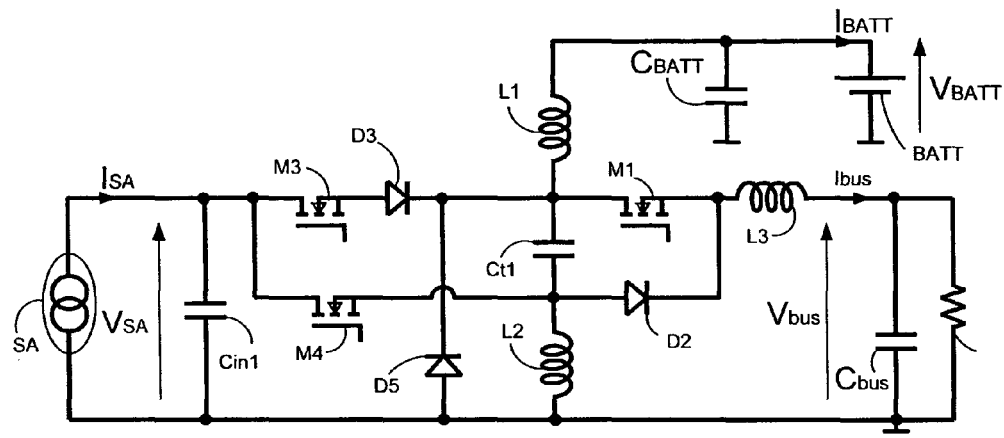
Figure 7A:
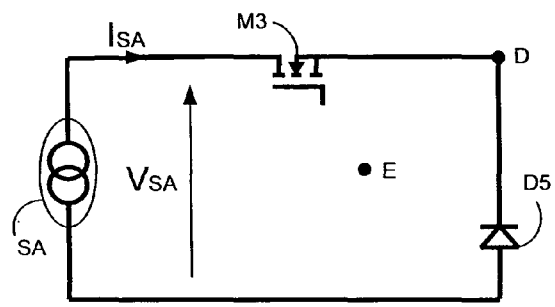
Figure 7B:
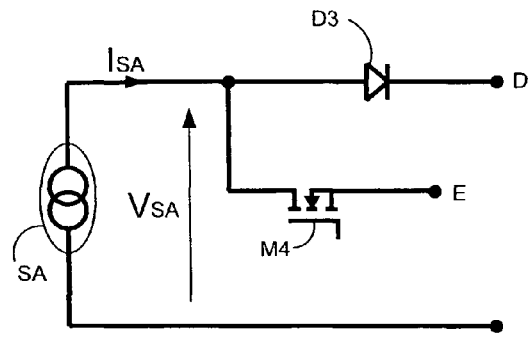
Figure 8:
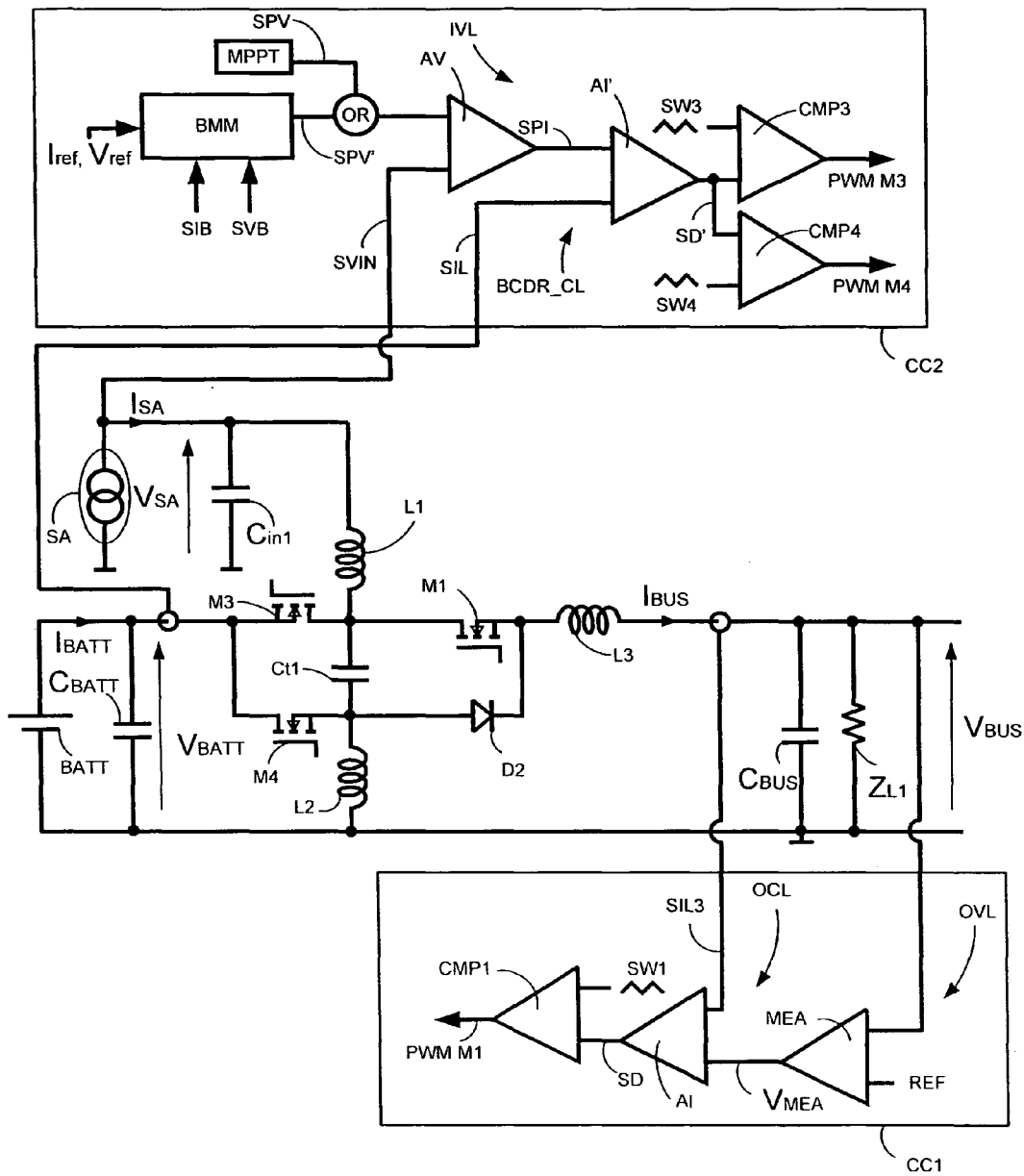
Figure 9:
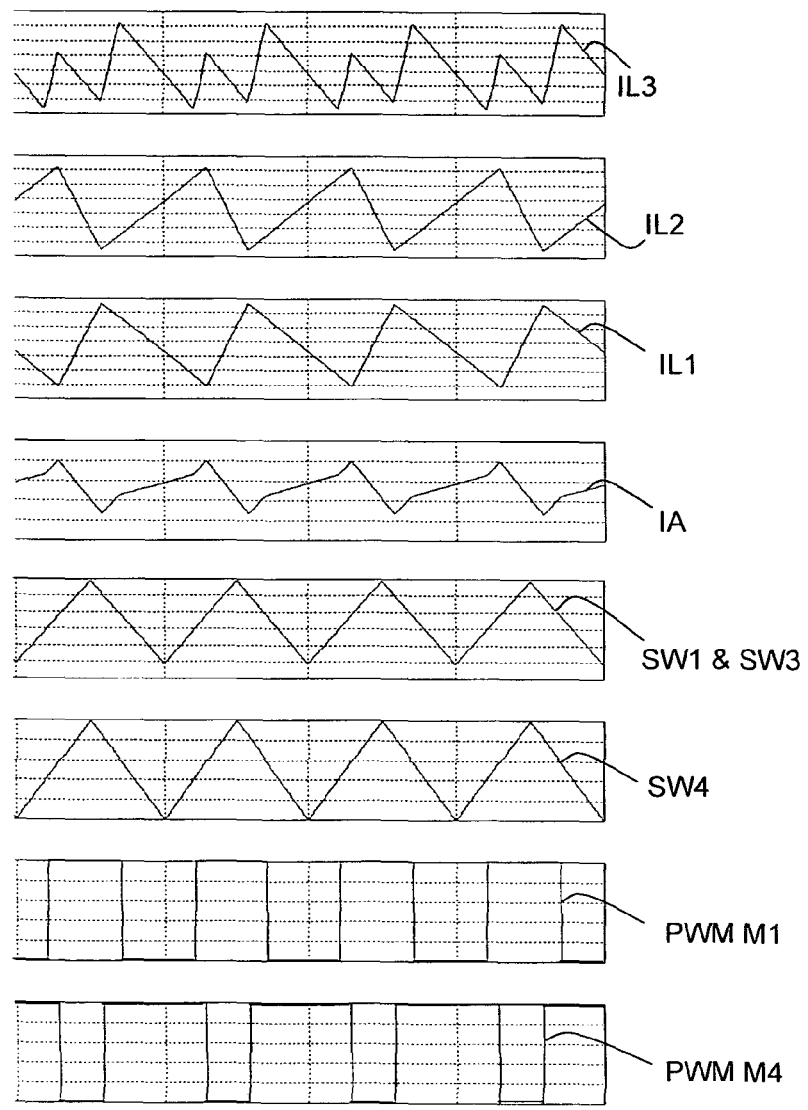
Figure 10:
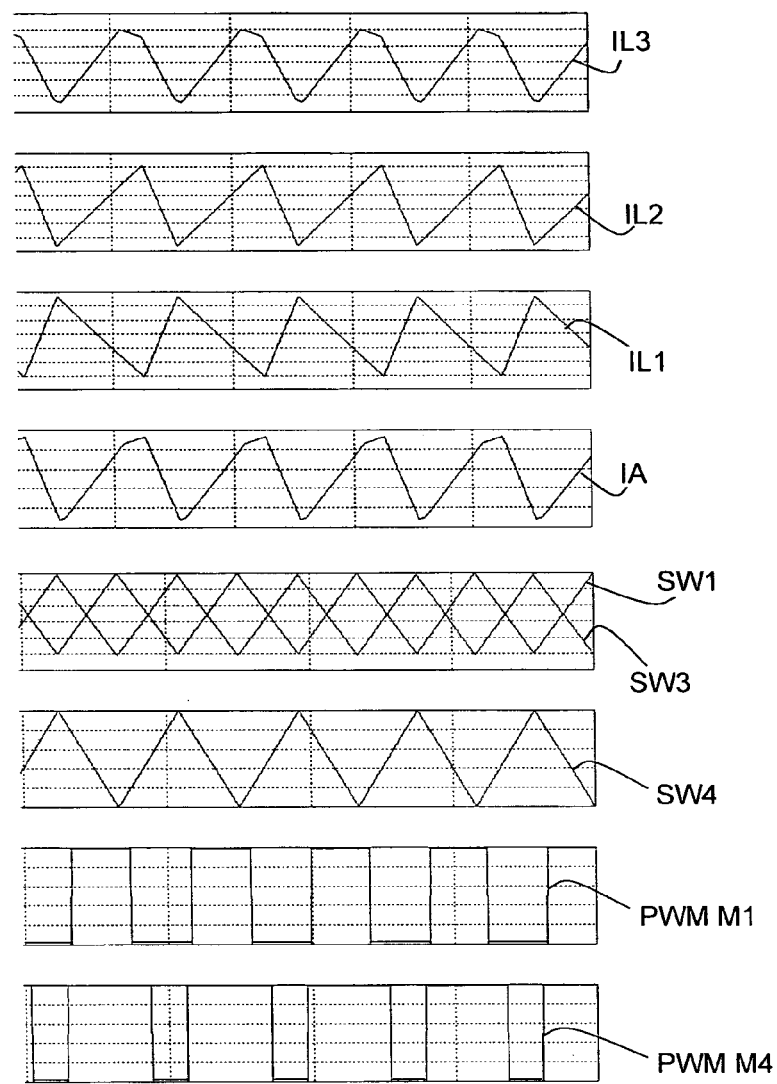
Figure 11:
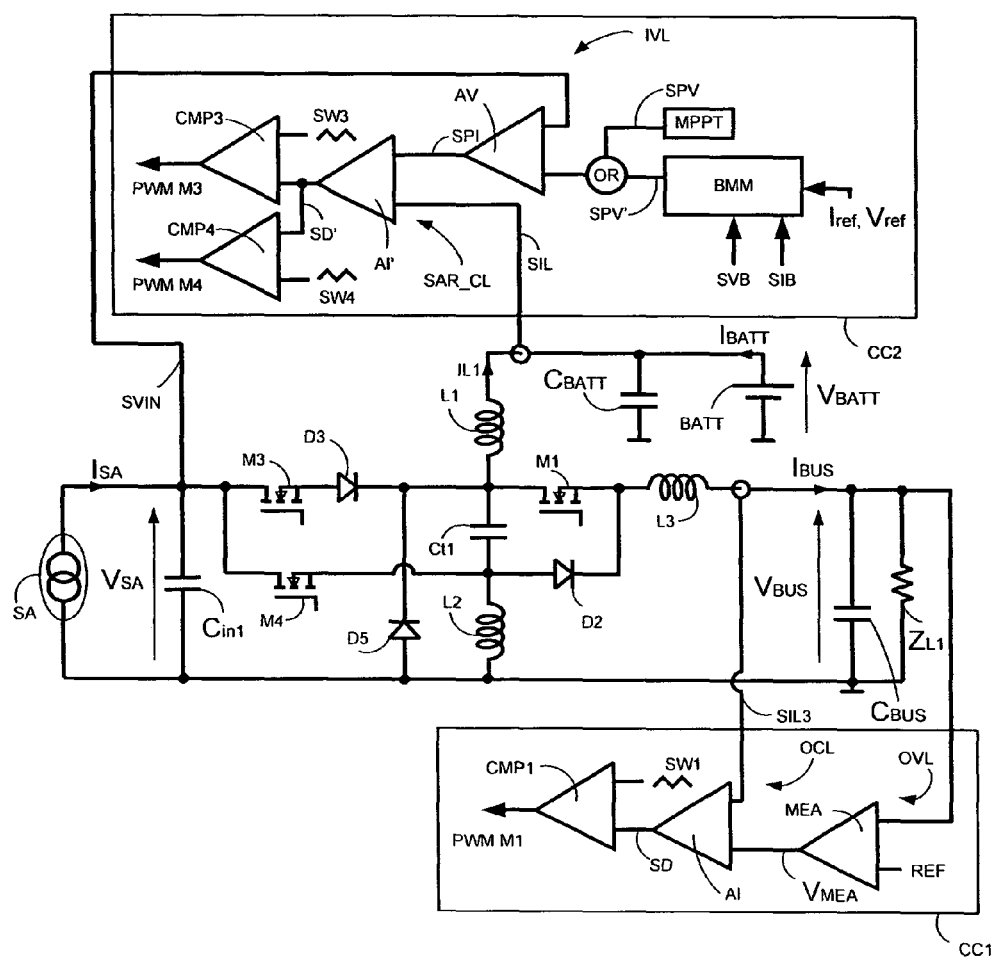
Figure 18:
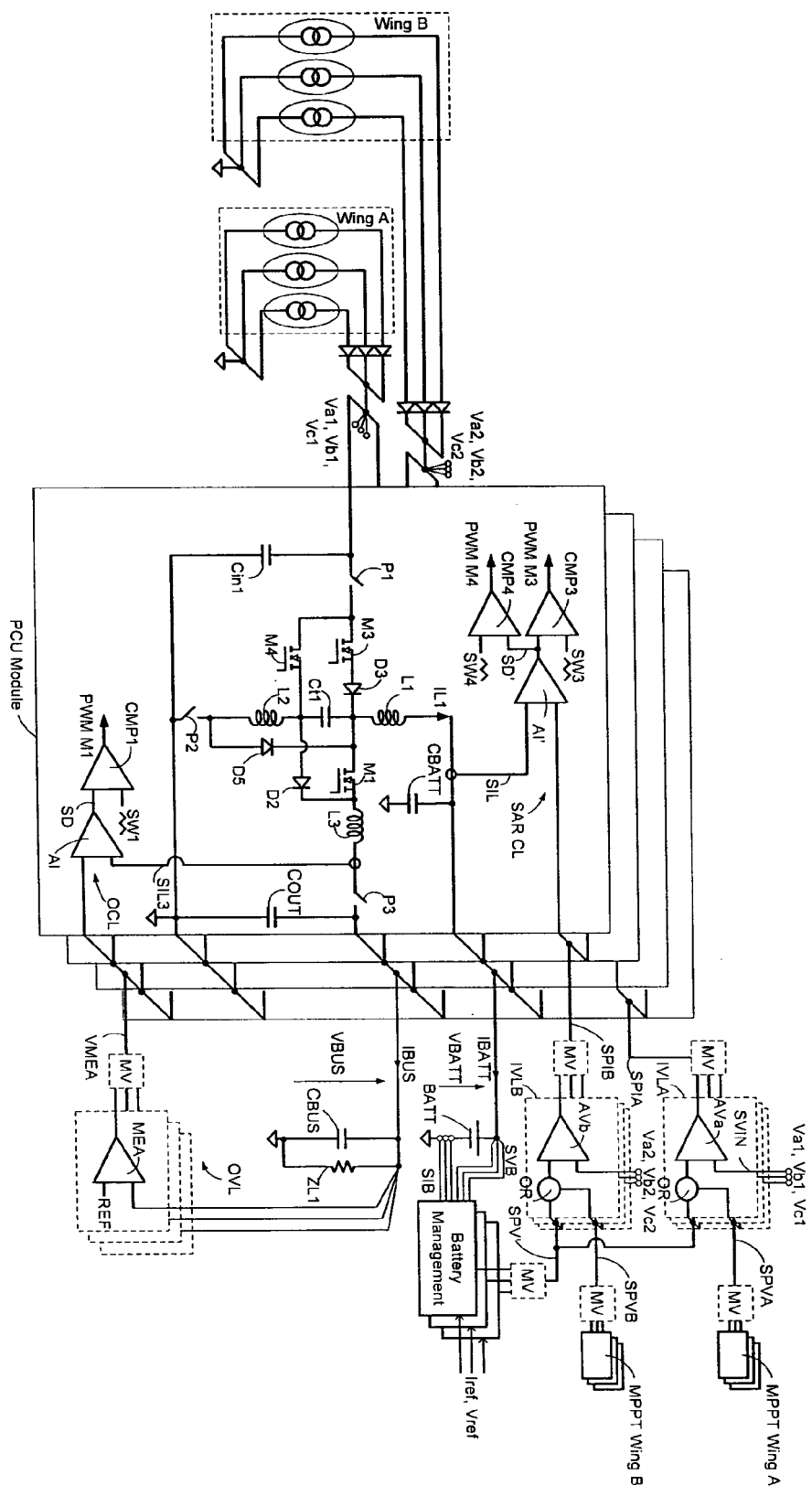
Figure 19:
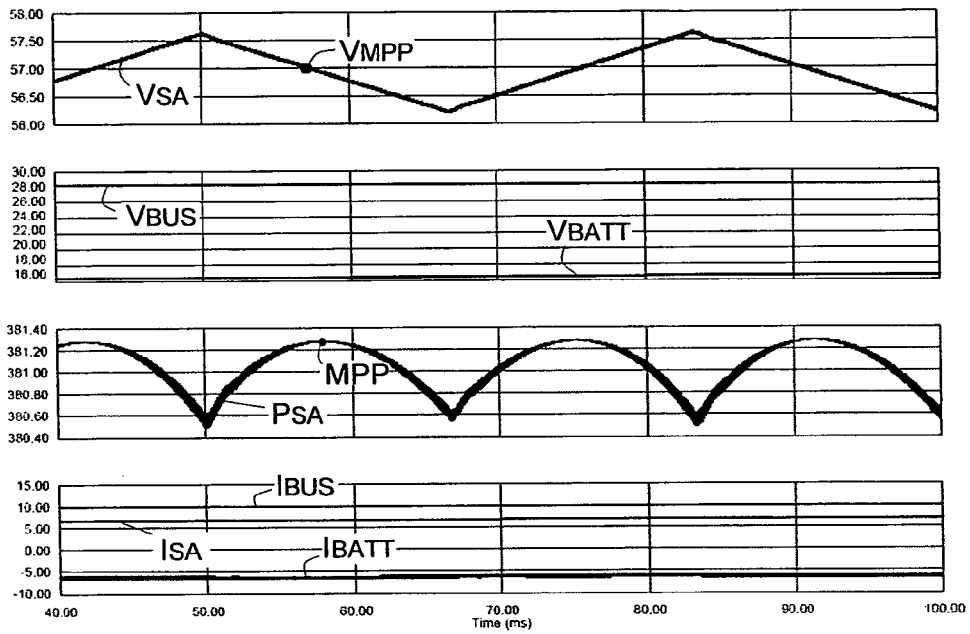
Figure 20:
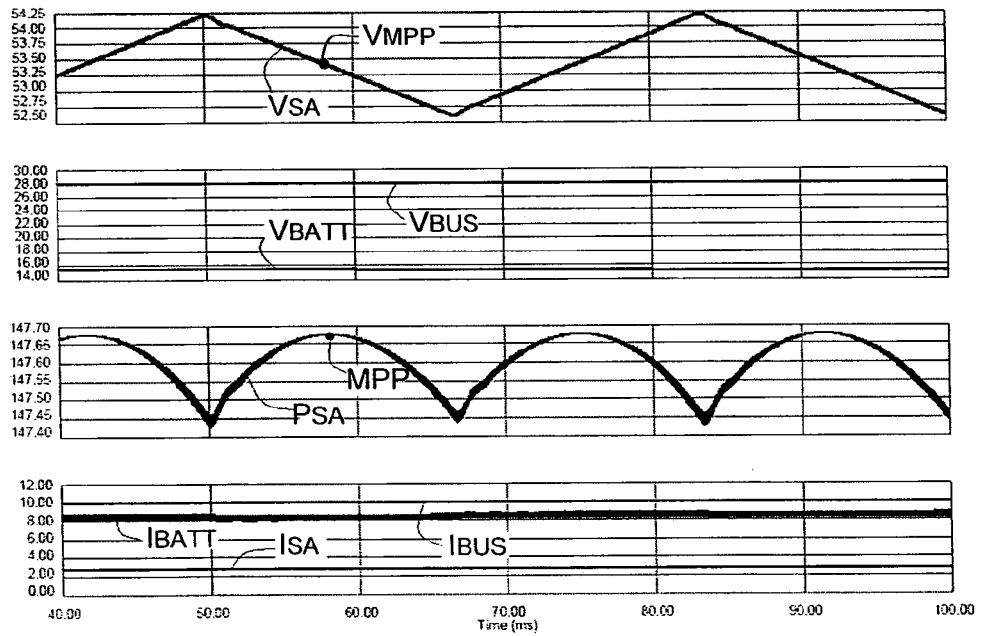

Additional features and advantages of the present invention will become apparent from the subsequent description, taken in conjunction with the accompanying drawings, which show:

FIGS. 1 and 2, two regulated power bus architectures according to the prior art;

FIG. 3, an electric scheme of a power conditioning unit according to the invention, in its most general form;

FIG. 4, an electric scheme of a power conditioning unit according to a first embodiment of the invention;

FIG. 5, a diagram illustrating the operational condition of the power conditioning unit of FIG. 4;

FIG. 6, an electric scheme of a power conditioning unit according to a second embodiment of the invention;

FIGS. 7A and 7B, two schemes of simplified input switching structures for use in the power conditioning unit of FIG. 6;

FIG. 8, a block diagram of a power conditioning system comprising the power conditioning unit of FIG. 4;

FIG. 9, a set of diagrams illustrating an improper operation of the power conditioning system of FIG. 8;

FIG. 10, a set of diagrams illustrating a proper operation of the power conditioning system of FIG. 8;

FIG. 11, a block diagram of a power conditioning system comprising the power conditioning unit of FIG. 6;

FIGS. 12 to 17 and 21 to 23, diagrams illustrating the results of tests performed on the power conditioning system of FIG. 11;

FIG. 18, the diagram of a power conditioning system of the kind illustrated on FIG. 11, providing hot redundancy;

FIGS. 19 and 20, a set of diagrams illustrating the results of a numerical simulation showing the operation of the power conditioning system of FIG. 8.

FIG. 3 illustrates, in its most generic form, a power conditioning unit according to the invention.

Such a power unit has three terminals, or ports:

A battery can be connected either to port A or to port B;

A solar array (or a different electric power generator) can be connected either to port B or to port A;

Port C is an output port to generate a regulated power bus.

The power unit is built around reactive structure RS, connected between terminal B and the ground, formed by a serial connection of a first inductor L1, a capacitor Ct1 and a second inductor L2.

Reactive structure RS also comprises two nodes: D, which is situated between L1 and Ct1; and E, which is situated between Ct1 and L2.

An input switching structure ISWS is connected between port A and the nodes D, E. An output switching structure OSWS is connected between nodes D, E and port C. More precisely:

The output structure OSWS comprises a first switch S1 connected between node D and a third node F, a second switch S2 connected between node E and node F, and a third inductor L3 in series to the parallel connection of S1 and S2 between node F and port C. Inductor L3 is necessary because a voltage generator (i.e. a battery or a solar array operating in the voltage part of its characteristics) can be connected to port A, and port C can be connected to a regulated bus at a different voltage level. Two voltage generators cannot be connected directly to each other: an in-series inductor is required to transform one of them into a current source. For this reason such an in-series inductor has to be provided between port A and port B (L1), between port B and port C (L1 in series with L3) and also between port A and port C (L3 alone).

The input structure ISWS comprises a third switch S3 connected between port A and node D. Depending on the particular embodiment, it can also comprise a fourth switch S4 connected between port A and node E, and/or a fifth switch S5 connected between node D and the ground.

On FIG. 3:

VA, VB, VC are the voltage level of ports A-C;

IA, IL1, IL2, IL3 are the current flowing from port A into the input switching structure and through inductors L1, L2 and L3, respectively;

CA, CB and CC are capacitors connected between ports A, B, C and the ground, respectively.

The switches S1-S5 can be either:

non-controllable switches, unidirectional in current i.e. rectifiers such as diodes;

controllable switches, bidirectional in current e.g. a transistor such as MFETs; or controllable switches, unidirectional in current e.g. a transistor (such as a MFET) connected in series with a rectifier (such as a diode).

Unidirectional switches can also be implemented by using synchronous rectifier, i.e. controlled switches (e.g. MFETs) driven in a suitable way. Synchronous rectifiers are known in the field of power electronics; they are advantageous as they introduce a lower voltage drop than uncontrolled rectifiers such as diodes.

In this application, the term "rectifier" will be used as a general term for indicating both uncontrolled rectifier such as diodes and synchronous rectifiers.

Several input switching structures and/or several output switching structures can also be connected in parallel to a same reactive structure RS. This way, the PCU of the invention can control several solar arrays or batteries, and/or generate a plurality of regulated buses.

One idea at the basis of the invention is that the input switching structure forms, with the reactive structure RS, a first DC/DC converter and the output switching structure forms, with the same reactive structure RS, a second DC/DC converter. The two converters condition the power flowing between the ports A, B and C. As they share the same reactive elements, they have much lower mass and volume than two independent converters, which are used in conventional PCUs. Moreover, by slightly modifying the switching structures, and without changing its topology, the unit of the invention can be adapted to different operating conditions, which usually require completely different PCU.

FIG. 4 shows a PCU according to a first embodiment of the invention wherein:

the first switch is implemented by a MFET M1;

the second switch is implemented by a diode D2, allowing current flow from the reactive structure towards port C;

the third and fourth switches are implemented by respective MFETs M3 and M4, and there is no fifth switch.

As discussed above, diode D2 could be replaced by a synchronous rectifier.

A battery, with a capacitor $C_{BATT}$ in parallel, is connected to port A. A solar array SA, also with a capacitor $C_{in1}$ in parallel, is connected to port B.

The input switching structure forms, with the reactive structure RS, a reversible two-inductor buck/boost converter which, being disposed between the solar array (port B) and the battery (port A) acts both as a BCR and a BDR. The output switching structure forms, with the reactive structure RS, a two-inductor buck converter. Such a topology could be called a Buck-Buck-Boost-Regulator ($B^3R$) as it steps-down the power from the solar array to the battery in charge mode, steps-down the power from the solar array to the regulated bus, and finally steps-up the power from the battery to the bus via nodes D and E in discharge mode.

The DC equations of the converter of FIG. 4 between ports A, B and C are:

$$V_{SA} = \frac{V_{BATT}}{d_3} = \frac{V_{BATT}}{1-d_4} \text{(for both } BCR \text{ and } BDR \text{ modes)}$$

$$V_{bus} = V_{SA} \cdot d_1$$

$$V_{Ct1} = V_{SA}$$

$d_1$, $d_3$ and $d_4$ being the duty-cycles of M1, M3 and M4, respectively.

The PCU of FIG. 4 can replace advantageously that of FIG. 1 or FIG. 2. FIG. 5 shows the corresponding operating conditions: curves CVI1 and CVI2 are the V-I curves of the solar array SA for two different temperatures, MPP1 and MPP2 the corresponding maximum power points; $V_{bus}$ is the regulated bus voltage and $V_{BATT}$ is the admissible range of battery voltage. It can be seen that $V_{MPP1/MPP2} > V_{BUS} > V_{BATT}$.

FIG. 6 shows a PCU according to a second embodiment of the invention wherein:
the first switch is implemented by a MFET M1;
the second switch is implemented by a diode D2, allowing current flow from the reactive structure towards port C;
the third switch is implemented by a MFET M3 in series with a diode D3;
the fourth switches is implemented by a MFET M4, and
the fifth switch is implemented by a diode D5 allowing current flow from the ground to node D.

As discussed above, diodes D2, D3 and/or D5 could be replaced by respective synchronous rectifiers.

A solar array SA, with a capacitor $C_{in1}$ in parallel, is connected to port A. A battery, also with a capacitor $C_{BATT}$ in parallel, is connected to port B.

The input switching structure forms, with the reactive structure RS, a non-inverted superimposed two-inductor boost and a single inductor buck, operating as a step-up DET step-down converter (where DET means direct energy transfer) between the solar array and the battery. As in the previous embodiment, the output switching structure forms, with the reactive structure RS, a two-inductor buck converter, which is used as a BDR.

Such a topology could also be called a Buck-Buck-Boost-Regulator (B³R) as it steps-up or transfers directly or steps-down the power from the solar array to the battery and steps-down the power from the solar array to the regulated bus.

The DC equations of the converter of FIG. 6 between ports A, B and C are:

$$V_{SA} = \frac{V_{BATT}}{d_3} \text{ (in step-down mode, with } d_4 = 0\text{)}$$

$$V_{SA} = V_{BATT} \cdot (1-d_4) \text{ (in step-up mode, with } d_3 = 1\text{)}$$

$$V_{SA} = V_{BATT} \text{ (in DET—direct energy transfer—mode, with } d_3 = 1 \text{ and } d_4 = 0\text{)}$$

$$V_{bus} = V_{SA} \cdot d_1 \text{ (for all modes)}$$

$$V_{Ct1} = V_{BATT} \text{ (for all modes)}$$

$d_1$, $d_3$ and $d_4$ being again the duty-cycles of M1, M3 and M4, respectively.

Figure 12:
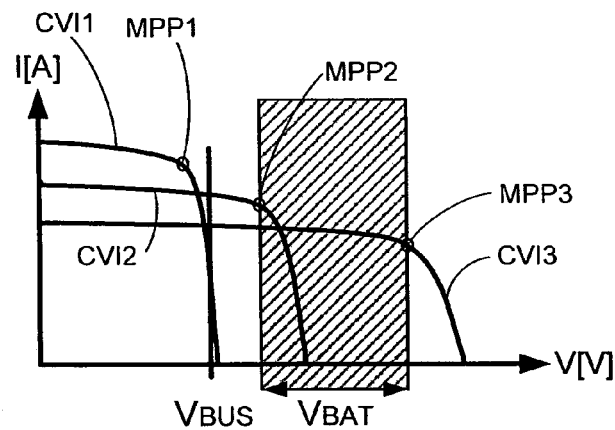

The PCU of FIG. 6 can replace advantageously that of FIG. 1 or FIG. 2, being at the same time simpler and more flexible. FIG. 12 shows the corresponding operating conditions: $V_{bus}$ is necessarily lower than $V_{BATT}$, but $V_{MPP1/MPP2/MPP3}$ can be lower, higher or equal to $V_{BATT}$ and/or Vbus.

In some particular cases, the PCU of FIG. 6—and more particularly its input switching structure, can be further simplified.

The simplified structure of FIG. 7A, where the third switch is implemented by a simple MFET M3 (without diode D3) and the fourth switch is suppressed, can be used when $V_{MPPT1/MPPT2}$ is consistently higher than $V_{BATT}$. Indeed, this input structure forms, with the reactive structure RS, a buck converter between the solar array and the battery. Again, in this structure diode D5 could be replaced by a synchronous rectifier.

The simplified structure of FIG. 7B, where the third switch is implemented by a simple diode D3 (without MFET M3) and the fifth switch is suppressed, can be used when $V_{MPPT1/MPPT2}$ is consistently lower than $V_{BATT}$. Indeed, this input structure forms, with the reactive structure RS, a two-inductor boost converter between the solar array and the battery. Again, in this structure diode D3 could be replaced by a synchronous rectifier.

For a PCU to be suitable for real-life application, it must be possible to implement a stable control loop thereof in order to stabilize its output voltage (i.e. the power bus voltage) and to charge correctly the battery and to track the maximum power point of the solar array when required. It is known in the art that the control of switching DC/DC converters is not always easy, because some topologies present right-half-plane zeros. In the present case, two converters—which have to be controlled simultaneously—share the same reactive elements (reactive structure RS), therefore they interfere with each other, and this could affect the stability of a control loop. A careful analysis of the PCUs of FIGS. 4 and 6, however, shows that stable control is indeed possible.

FIG. 8 shows a power conditioning system according to an embodiment of the invention, built around a PCU of the kind of FIG. 4.

On the bus side, a conventional output current loop (OCL) creates a PWM signal to control M1 and an output voltage loop (OVL) is implemented in order to regulate the bus voltage. More precisely, the output voltage loop OVL is constituted by a differential amplifier MEA generating a signal VMEA proportional to the difference between $V_{bus}$ and a reference voltage value REF. The output current loop OCL is constituted by a differential current amplifier AI generating a signal SD proportional to the difference between VMEA and a current feedback signal SIL3 proportional to the current flowing through L3. A comparator CMP1 receives at its inputs a sawtooth signal SW1 and SD and generates at its output a PWM signal driving M1 (PWM M1). The output current loop and the output voltage loop are implemented by a first control circuit CC1.

On the input side, a battery current loop BCDR_CL controls the current flowing in or out of the battery. Around this battery current loop, an input voltage loop IVL is implemented, controlling the solar array voltage.

The current reference value SPI is provided by a differential amplifier AV receiving:
at a first input port, a feedback signal SVIN which is a function of—and in particular is proportional to—the voltage at the input of the converter (i.e. the solar array voltage VSA); and at a second input port, a voltage set-point which can be provided either by a maximum-power point tracker MPPT (SPV) or by a battery management module BMM (SPV').

Maximum power point operation is required when:
either the maximum power provided by the solar array is insufficient to fulfil the power request from the load (the difference being provided by the battery);
or the maximum power provided by the solar array is sufficient to fulfil the power request from the load, but insufficient to charge the partially-discharged battery at its maximum charging current or end of charge reference.

Battery management module BMM is provided in order to take control of the power conditioning unit when operation at maximum power point is not required. The battery management module BMM implements a control loop having a first feedback signal SIB which is a function of (an in particular is proportional to) the battery charging current, a second feedback signal SVB which is a function of (and in particular is proportional to) the battery voltage, as well as current and voltage reference values $V_{ref}$ and $I_{ref}$. When the battery is discharged, the battery management controls the SAR by the signal SPV' in order to ensure a charge battery current proportional to the reference $I_{ref}$. At the end of charge of the battery, the battery management controls the BCDR_CI of FIG. 8 (or the SAR_CL of FIG. 11) by the signal SPV' in order to ensure an End of Charge battery voltage proportional to the reference $V_{ref}$.

Battery management modules are known by themselves. See e.g. the paper by Nikolaus Breier, Bernhard Kiewe and Olivier Mourra "The Power Control and Distribution Unit for the Swarm Satellites", European Space Power Conference ESPC 2008, 14—19 Sep. 2008 Konstanz, Germany.

Selection means are provided in order to choose between the MPPT voltage set-point SPV and the alternative voltage set-point SPV' provided by the battery management module BMM. In their simplest form, illustrated on FIGS. 8 and 11, said selections means are constituted by a logical "OR", implemented by wiring the outputs of the MPPT and of the BMM together. The logical "OR" implements either a "min" or a "max" function of its inputs. If the power request is higher than what the SAR can provide, the BMM set-point SPV' undergoes high (or low) saturation. Therefore, the MPPT-generated alternative voltage set-point SPV takes control as it is lower (respectively: higher) than the saturated signal in order to extract the maximum power from the solar array by controlling the solar array voltage.

The battery current loop BCDR_CL is constituted by a differential current amplifier AI' generating a signal SD' proportional to the difference between SPI and a current feedback signal SIL proportional to the current of the switching structure from port A, connected to the battery.

Two comparators CMP3 and CMP4 receive at their inputs SD' and respective sawtooth signals SW3 and SW4, and generate at their outputs PWM signals driving M3 and M4.

The battery current loop and the input voltage loop are implemented by a second control circuit CC2.

The plot of FIG. 9 shows, from the top to the bottom, plots of:
current IL3, flowing through inductor L3;
current IL2, flowing through inductor L2;
current IL1, flowing through inductor L1;
current IA, flowing through port A;
sawtooth signals SW1 and SW3/SW4, which are taken synchronous and in-phase with each other, and are therefore superposed in the figure;
PWM M1;
PWM M4.

It can be seen on FIG. 9 that when all the sawtooth signals (SW1 and SW3/SW4) are synchronous and without phase delay, the bus inductor current IL3 contains several maxima and minima during one period. This is an issue, as PWM1 is obtained by comparing a triangular sawtooth to IL3, which is supposed to have only one maximum and one minimum during the sawtooth period. Therefore, when the sawtooth signals SW1 and SW3/SW4 are synchronous and without phase delay, the control of the bus voltage does not operate correctly.

FIG. 10 corresponds to FIG. 9, but for the case where SW3 and SW4 are synchronous and in phase with each other, but delayed by 180° with respect to the sawtooth signal of the regulated power bus, SW1. Now the ripple of the regulated bus current (IL3) is not exactly triangular, but it contains only one maximum and minimum during the sawtooth period. Such a current ripple does not destabilise the current loop and can be used in an average or peak current loop circuitry.

The power conditioning system of FIG. 8 has been tested, by means of numerical simulations, in different conditions.

A first simulation is an image of what happens when a spacecraft is going out of eclipse with a solar array panel not capable to provide enough power to reach the maximum current charge of the battery. In this particular case (see FIG. 19), the MPPT extracts the maximum power from the solar array to supply firstly the power bus; the remaining power is transferred to charge of the battery. On the third plot from the top, curve PSA represents the power generated by the solar array.

On FIG. 19 it can be seen the solar array voltage VSA is modulated with a low frequency (below 100 Hz) triangular reference coming from the MPPT cell (SPV). The converter on the solar array side is oscillating around the solar array maximum power point (MPP). It can be seen the Maximum Power Point Voltage is higher than the bus voltage, around 57V. On the bus side the power bus is regulated at 28V. The battery voltage in this simulation is around 16V and below the regulated bus voltage. The battery voltage increases slightly since some current (6A) is injected into it to recharge it.

A second simulation (FIG. 20) has been performed for the situation where the power requested by the regulated bus is higher than the available solar array power. In other words, the MPPT of the converter is operative and extracts the maximum power from the solar array, but the battery discharge regulator has to provide the remaining power in order to guarantee the power bus regulation.

On FIG. 20 it can be seen the solar array voltage VSA is modulated with a low frequency triangular reference coming from the MPPT cell (SPV). The converter on the solar array side is oscillating around the solar array maximum power point (MPP). Once again the Maximum Power Point Voltage is higher than the bus voltage (here around 53.5V).

On the bus side the power bus is regulated at 28V. The battery voltage in this simulation is around 15V and below the regulated bus voltage.

This second simulation corresponds to an exceptional case, as the battery is solicited in sunlight in order to guarantee the bus regulation. Such peak power bus demand shall occur during short period. Indeed the rest of the sunlight shall be sufficient to fully recharge the battery before entering in eclipse.

However this simulation is important to consider as it proves, together with the first one, that the input voltage loop (IVL) is capable to follow the request (SPV) from the MPPT cell by regulating the solar array voltage with both a positive (discharge) and a negative (charge) battery current.

On both simulations, the power bus regulation is not affected by the tracking on the solar array side.

FIG. 11 shows a power conditioning system according to another embodiment of the invention, built around a PCU of the kind of FIG. 6. The control part of this system is analogous to that already described in reference to FIG. 8; in this case too the control architecture is based on a current loop, SAR_CL, nested within an input voltage loop IVL. And in this case, too, the phase relationship between the sawtooth signals is important. But now, in order to ensure a stable control, it is required that the sawtooth signals SW1 and SW3/SW4 are synchronous and without phase delay.

If the PCU of FIG. 11 is replaced by a simplified one, according to FIG. 7A or 7B, the second control circuit only has to generate the second or the third PWM signal.

Figure 21:
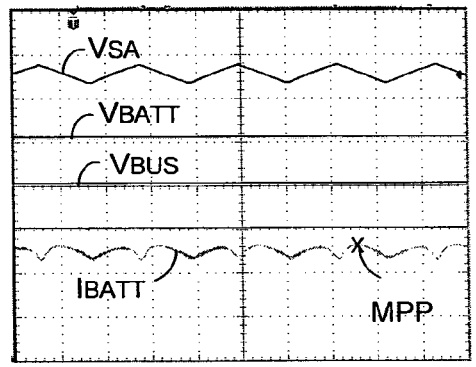
Figure 22:
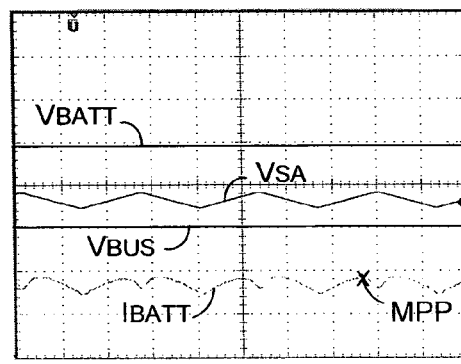
Figure 23:
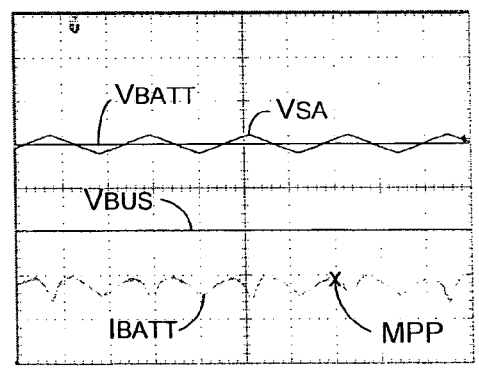

The power conditioning system of FIG. 11 has been tested in laboratory, and the results are shown on FIGS. 21, 22 and 23. For all figures, the converter is in MPPT mode. On FIG. 21, $V_{MPP} > V_{BATT}$; on FIG. 22, $V_{MPP} < V_{BATT}$, and on FIG. 23 $V_{MPP} = V_{BATT}$.

It can be seen on these plots that the input voltage loop is controlled such that the converter on the solar array side is oscillating around the MPP at a low frequency. On the power bus side, the regulation is also operating during the MPPT operation and maintains the bus voltage at 15V.

Laboratory tests have also allowed measuring the efficiency of the power conditioning system by emulating its operational conditions on a LEO spacecraft. These conditions are illustrated by FIG. 12, where CVI1, CVI2 and CVI3 are the I-V characteristics of a solar array constituted by 14 cells in series at +100° C., +35° C. and −100° C. respectively. The corresponding MPP voltages are: 24 V, 31 V and 42 V. The bus voltage is regulated at 28 V and the battery voltage varies between 31 V (discharged) and 42 V (fully charged).

Figure 13:
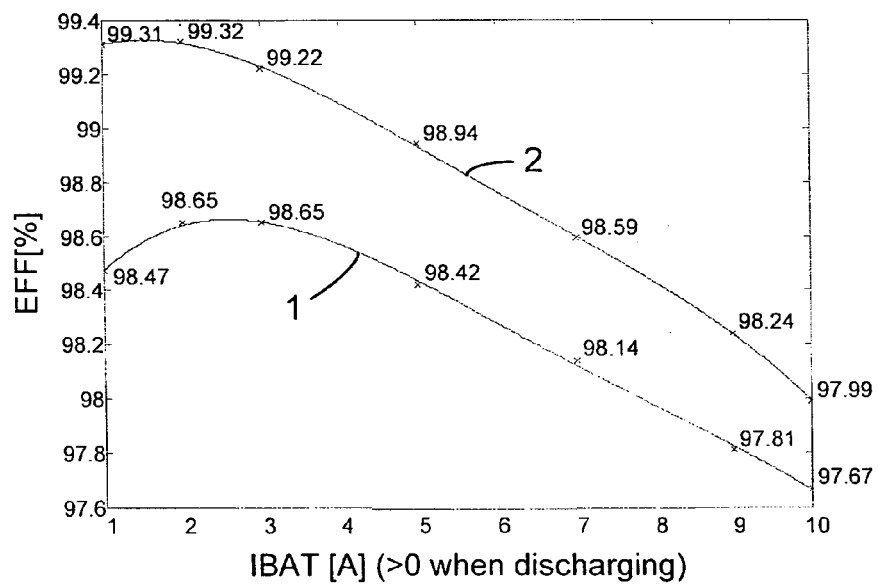

On FIG. 13, the curves 1 and 2 represent the efficiency of the PCU in eclipse, when no power comes from the solar array. In these conditions, the input switching structure is inactive (the battery current loop SAR_CL is saturated high or low and, depending from the specific implementation, M3 is open and M4 is closed or vice-versa) while the output switching structure is switching in order to step-down the battery voltage to the bus voltage. Curves 1 and 2 correspond, respectively, to the extreme cases $V_{BATT} = 42V$ (at the beginning of the eclipse, when the battery is fully charged) and $V_{BATT} = 31V$ (worst case at the end of the eclipse, when the battery is discharged). It can be seen that the efficiency is higher when the battery voltage is close to the bus voltage; this is advantageous, as the more the battery discharges, the more the efficiency increases, saving some energy.

At the end of the eclipse, the battery is discharged (31V), the bus regulated at 28 V and the solar arrays are cold (−100 degrees). The MPP is high (42V) and far from the battery discharge voltage.

In these conditions, the input switching structure is operated in order to step the solar array voltage down to the battery level, and the output switching structure steps this voltage further down to the bus level.

Figure 14:
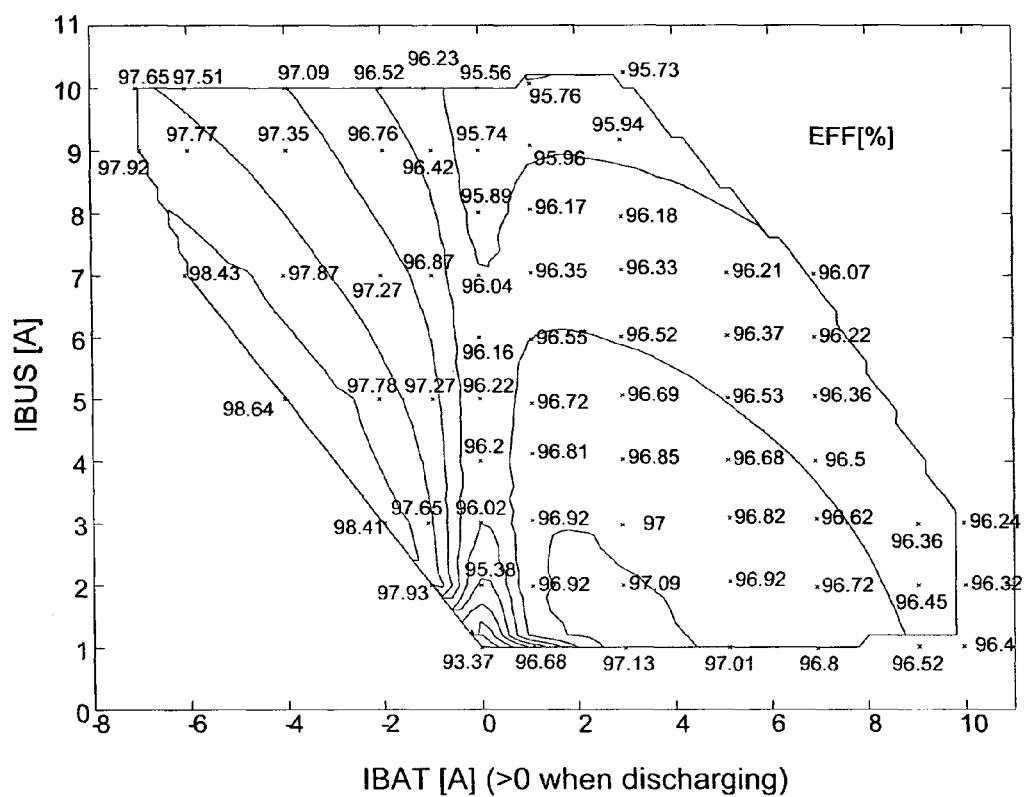

FIG. 14 is a contour/density plot of the PCU efficiency as a function of the bus current $I_{bus}$ and of the battery current $I_{bat}$. Indeed, in these conditions the solar array has to feed the bus and charge the battery at the same time. It can be seen on the plot that the total PCU efficiency considering all ports currents and voltages can exceed 98%.

Figure 15:
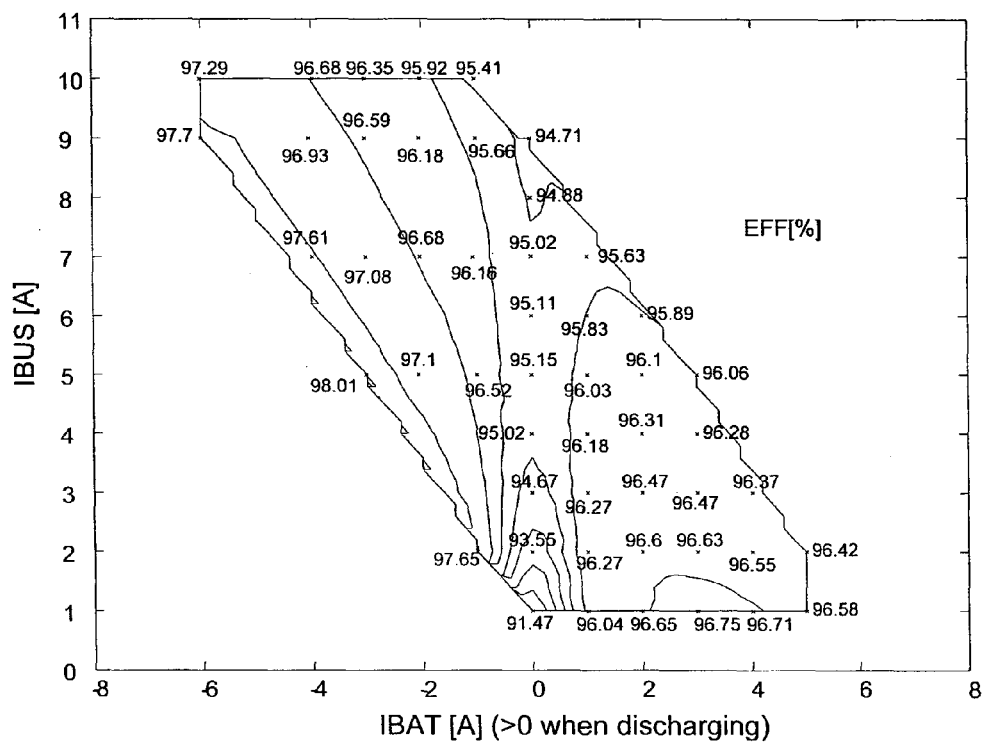

At the end of the sunlight period the battery is fully charged (42V) and the solar array is hot, at 100° C., leading to a lower MPP voltage (24V). In these conditions the solar array voltage has to be stepped up to the battery level and then down to the bus level. This is not optimal in terms of efficiency. However, FIG. 15 shows that efficiency in excess of 94% can still be achieved and since the battery is fully charged, the power system is in excess of solar array power, and not in MPPT mode.

Figure 16:
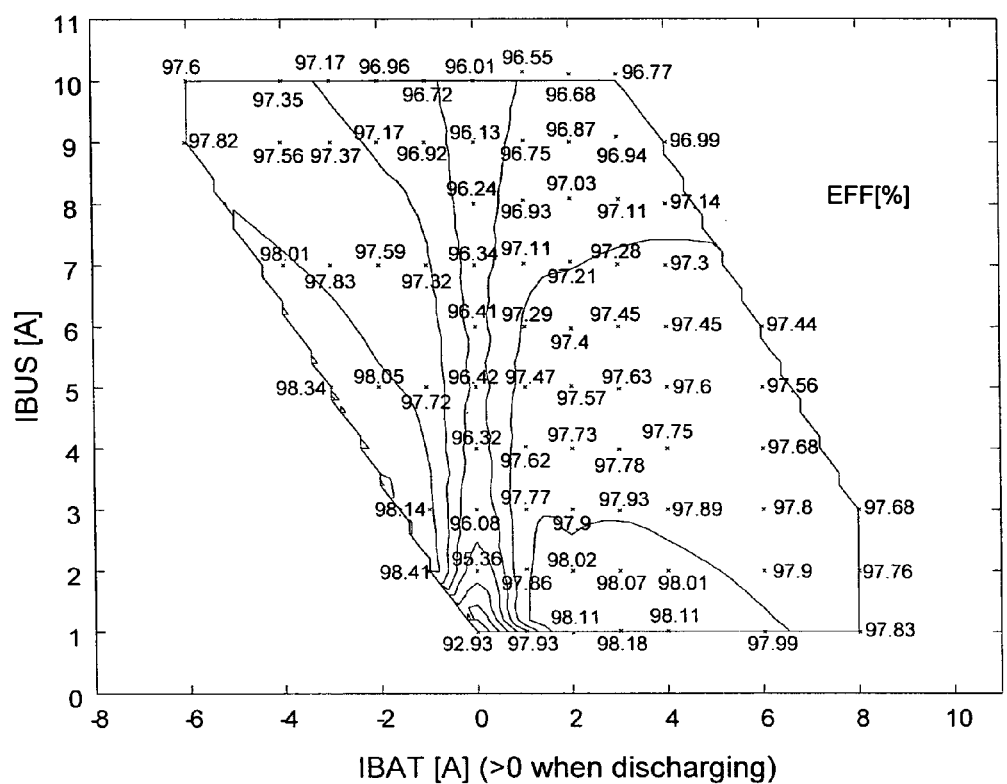
Figure 17:
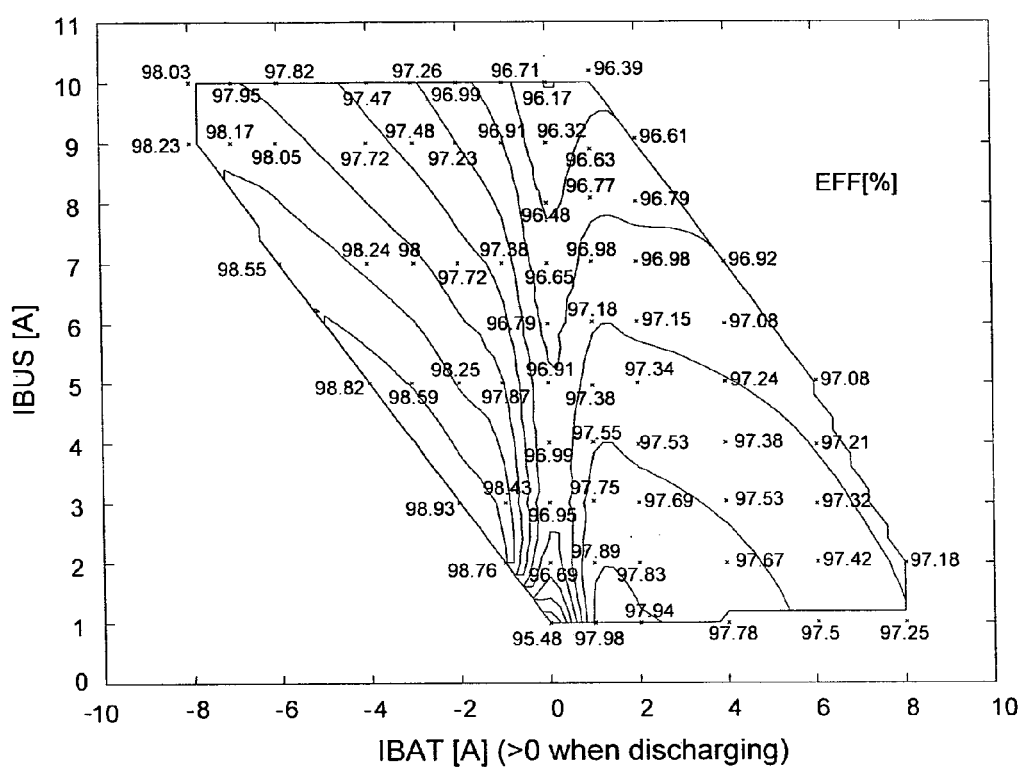

The power conditioning system has also been tested in DET (directly energy transfer) between the solar array and the battery. In these conditions, the output structure is operated in order to step down the solar array and battery voltage to the bus level. FIG. 16 corresponds to DET between a cold solar array and a charged battery, FIG. 17 to DET between a solar array at 35° C. and a discharged battery. In both cases the total PCU efficiency exceeds 96%.

In a conventional power system (FIG. 1 or 2) the total efficiency is given by the product of the efficiencies of at least two different PWM converters. These converters need respective input and/or output filters, and connections between them are often not optimized due to mechanical constraints. The present invention allows minimizing the losses, and in particular the conduction losses, using a single converter based on a single reactive structure. This leads to the very high efficiency values, as it has been experimentally verified in the particular case discussed above.

The application of a power conditioning system according to the invention to a spacecraft requires the implementation of a suitable redundancy scheme. For example, FIG. 18 presents a single point failure free power system of a two-wing spacecraft wherein, for each solar array wing, two PCU modules of the kind illustrated on FIG. 11 are used. In case of internal failure, the failed module is disconnected thanks to protection switches P1, P2 and P3.

On the control circuitry side each PCU module contains a dedicated solar array current loop (SAR CL). Thanks to this loop the current is shared on the solar array side between the different modules attached to the same wing. Around this SAR CL, the solar array wing voltage is controlled by an input voltage loop (IVLA, IVLB). The signals generated by the input voltage loops IVLA, IVLB are majority-voted (MV) in order to provide a reliable request (SPIA, SPIB) to the SAR CL. The setting point of the solar array voltage is provided either by a reliable majority voted signal (SPVA for wing A and SPVB for wing B) coming from redundant MPPT cells or by a reliable, majority-voted signal (SPV') coming from redundant battery management modules BMM. On the bus side, module current sharing is also obtained thanks to the output current loop (OCL) implemented for each PCU module. The regulation of the bus is guaranteed by a reliable majority-voted main error amplifier signal (VMEA), coming from redundant main error amplifiers (MEA). A very similar redundancy scheme can be applied to the PCU architecture of FIG. 8.

The invention claimed is:
1. An electrical power conditioning unit comprising:
a first terminal (A) for connecting either an electrical power generator (SA) or a battery (BATT);
a second terminal (B) for connecting either a battery or an electrical power generator, respectively;
a third terminal (C) for connecting a power bus;
characterized in that it further comprises:
a reactive structure (RS) connected between said second terminal and the ground, formed by a serial connection of a first inductor (L1), a capacitor (Ct1) and a second inductor (L2), a first (D) and second (E) nodes being provided between the first inductor and the capacitor, and between the capacitor and the second inductor, respectively;

at least one output switching structure (OSWS) for connecting the third terminal (C) to the first and second nodes through respective first (S1) and second (S2) switches and a third in-series inductor (L3); and at least one input switching structure (ISWS) for connecting the first terminal (A) to at least the first node through a third switch (S3).

2. An electrical power conditioning unit according to claim 1, wherein:

the first switch of said or at least one output switching structure is a controlled switched bidirectional in current (M1); and the second switch of said or at least one output switching structure is a rectifier (D2) connected in order to allow current flow toward said third terminal, whereby the reactive structure and the output switching structure form a step-down DC-DC converter.

3. An electrical power conditioning unit according to claim 2 wherein:

the third switch of said or at least one input switching structure is a controlled switch bidirectional in current (M3);

and wherein said or at least one input switching structure also comprises a fourth switch (S4, M4), which is also controlled and bidirectional in current, for connecting the first terminal to said second node;

whereby the reactive structure and said input switching structure form a step-up and step-down DC-DC converter.

4. An electrical power conditioning unit according to claim 2 wherein:

the third switch of said or at least one input switching structure is a controlled switch unidirectional in current (M3), connected in order to allow current flow only from said first terminal to the first node of the reactive structure;

and wherein said or at least one input switching structure also comprises:

a fourth switch (M4), controlled and bidirectional in current, for connecting the first terminal to said second node; and a rectifier (S5, D5) connected between the first node and the ground, allowing current flow only from the ground to said first node;

whereby the reactive structure and said input switching structure form a step-up, direct-energy-transfer and step-down DC-DC converter.

5. An electrical power conditioning unit according to claim 2 wherein:

the third switch of said or at least one input switching structure is a rectifier (D3), connected in order to allow current flow only from said first terminal to the first node of the reactive structure;

and wherein said or at least one input switching structure also comprises a fourth switch (M4), controlled and bidirectional in current, for connecting the first terminal to said second node; and whereby the reactive structure and said input switching structure form a step-up DC-DC converter.

6. An electrical power conditioning unit according to claim 2 wherein:

the third switch of said or at least one input switching structure is a controlled switch bidirectional in current (M3);

and wherein said or at least one input switching structure also comprises a rectifier (D5) connected between the first node and the ground, allowing current flow only from the ground to said first node;

whereby the reactive structure and said input switching structure form a step-down DC-DC converter.

7. An electrical power conditioning system comprising:

an electrical power conditioning unit (PCU) according to claim 2; and a first control circuit (CC1) for generating a first pulse-width modulation signal (PWM M1) driving the first switch (M1) of said power conditioning unit, said first control circuit implementing a current control loop (OCL) for generating said first pulse-width modulation signal using a first current feedback signal (SIL3) proportional to a current flowing through said third in-series inductor (L3).

8. An electrical power conditioning system comprising: an electrical power conditioning unit according to claim 3, and a first control circuit (CC1) for generating a first pulse-width modulation signal (PWM M1) driving the first switch (M1) of said power conditioning unit, said first control circuit implementing a current control loop (OCL) for generating said first pulse-width modulation signal using a first current feedback signal (SIL3) proportional to a current flowing through said third in-series inductor (L3); and further comprising a second control circuit (CC2) for generating:

a second pulse-width modulation signal (PWM M3), driving the third switch (M3) of said power conditioning unit; and a third pulse-width modulation signal (PWM M4), complementary to said second pulse-width modulation signal, driving the fourth switch (M4) of said power conditioning unit;

said second control circuit implementing a current control loop (BCDR_CL) for generating said second and third pulse-width modulation signals using a second current feedback signal (SIL) proportional to a current flowing through the first terminal (A) of the power conditioning unit.

9. An electrical power conditioning system according to claim 8 wherein:

said first control circuit (CC1) comprises means for generating a first sawtooth or triangular voltage signal (SW1); and a first comparator (CMP1) for comparing said sawtooth or triangular signal with a first reference voltage level (SD) depending from said first current feedback signal (SIL3), the first pulse-width modulation signal corresponding to the output of said first comparator;

said second control circuit comprises: means for generating a second sawtooth or triangular voltage signal (SW3); and a second comparator (CMP3) for comparing said sawtooth or triangular signal with a second reference voltage level (SD') depending from said second current feedback signal (SIL), the second pulse-width modulation signal corresponding to the output of said second comparator; and said second control circuit also comprises: means for generating a third sawtooth or triangular voltage signal (SW4), synchronous and in-phase with said second sawtooth or triangular voltage signal (SW3) and with a voltage offset with respect to it; and a third comparator (CMP4) for comparing said sawtooth or triangular signal with said second reference voltage level, the third pulse-width modulation signal corresponding to the output of said third comparator;
said second and third sawtooth or triangular voltage signals being synchronous with said first sawtooth or triangular voltage signal and phase delayed by 180° with respect to it.

10. An electrical power conditioning system according to claim 8 wherein said second control circuit also implements an inner voltage control loop (IVL) for generating said second reference voltage (SD') value using a first voltage feedback signal (SVIN) proportional to a voltage level of the second terminal (B) of the power conditioning unit.

11. An electrical power conditioning system according to claim 7 further comprising:
at least one battery (BAIT) connected to the first port (A) of the power conditioning unit; and
at least one solar array (SA) connected to the second port (B) of said power conditioning unit.

12. An electrical power conditioning system comprising: an electrical power conditioning unit according to claim 4, and
a first control circuit (CC1) for generating a first pulse-width modulation signal (PWM M1) driving the first switch (M1) of said power conditioning unit, said first control circuit implementing a current control loop (OCL) for generating said first pulse-width modulation signal using a first current feedback signal (SIL3) proportional to a current flowing through said third in-series inductor (L3); and
further comprising a second control circuit (CC2) for generating at least a second pulse-width modulation signal, driving one switch of the input switching structure of the power conditioning unit; said second control circuit implementing a current control loop (SAR_CL) for generating said second pulse-width modulation signal using a second current feedback signal (SIL) proportional to a current flowing through the first inductor of the reactive structure of the power conditioning unit.

13. An electrical power conditioning system according to claim 12 wherein:
said first control circuit (CC1) comprises means for generating a first sawtooth or triangular voltage signal (SW1); and a first comparator (CMP1) for comparing said sawtooth or triangular signal with a first reference voltage level (SD) depending from said first current feedback signal (SIL3), the first pulse-width modulation signal corresponding to the output of said first comparator;
said second control circuit comprises: means for generating at least a second (SW3) or third (SW4) sawtooth or triangular voltage signal; and at least a second comparator (CMP3, CMP4) for comparing said sawtooth or triangular signal with a second reference voltage level (SD') depending from said second current feedback signal (SIL), the second or third pulse-width modulation signal corresponding to the output of said second comparator;
said second or third sawtooth or triangular voltage signal being synchronous and in phase with said first sawtooth or triangular voltage signal.

14. An electrical power conditioning system according to claim 12 wherein said second control circuit also implements an inner voltage control loop an outer voltage control loop (IVL) for generating said second reference voltage value (SD') using a first voltage feedback signal proportional to a voltage level of the first terminal of the power conditioning unit.

15. An electrical power conditioning system according to claim 7, further comprising:
at least one solar array (SA) connected to the first port (A) of the power conditioning unit; and
at least one battery (BATT) connected to the second port (B) of said power conditioning unit.

16. An electrical power conditioning system according to claim 7 wherein said first control circuit also implements an outer voltage control loop (OVL) for generating said first reference voltage value using a first voltage feedback ($V_{bus}$) signal proportional to a voltage level of the third terminal of the power conditioning unit.

17. An electrical power conditioning system according to claim 12, further comprising:
at least one solar array (SA) connected to the first port (A) of the power conditioning unit; and
at least one battery (BATT) connected to the second port (B) of said power conditioning unit.

18. An electrical power conditioning system according to claim 12 wherein said first control circuit also implements an outer voltage control loop (OVL) for generating said first reference voltage value using a first voltage feedback ($V_{bus}$) signal proportional to a voltage level of the third terminal of the power conditioning unit.

* * * * *